United States Patent [19]

Yano et al.

[11] Patent Number: 4,878,924
[45] Date of Patent: Nov. 7, 1989

[54] INTEGRATED SEPARATOR FOR SOLID AND GAS CONTAMINANTS IN ENGINE OIL

[75] Inventors: Hisashi Yano; Hiroyuki Ihara; Junsuke Yabumoto, all of Kanagawa, Japan

[73] Assignee: Mitsubishi Oil Co., Ltd., Tokyo, Japan

[21] Appl. No.: 223,047

[22] Filed: Jul. 22, 1988

[30] Foreign Application Priority Data

Jul. 30, 1987 [JP] Japan .................................. 62-188976
May 17, 1988 [JP] Japan .................................. 63-118180

[51] Int. Cl.$^4$ ............................................. B01D 19/00
[52] U.S. Cl. ......................................... 55/204; 55/267; 55/337; 210/168; 210/188; 210/416.5; 210/512.1
[58] Field of Search ........................ 55/204, 267, 337; 210/167, 168, 188, 436, 416.5, 512.1

[56] References Cited

U.S. PATENT DOCUMENTS 3,845,840  11/1974  Thrasher .......................... 55/337 X
3,898,068  8/1975   McNeil ............................. 55/337 X Primary Examiner—Charles Hart
Attorney, Agent, or Firm—Sughrue, Mion, Zinn, Macpeak & Seas

[57] ABSTRACT

An integrated and compact separator for removing both solid and gaseous contaminants from engine oil. Oil to be cleaned is introduced tangentially into a vortex flow chamber. Oil stripped of gaseous contaminant passes through pores in the outer wall of the vortex flow chamber into a filter system, while gas-rich oil collected near the center of the chamber passes into a gas removal pipe extending in the chamber at its axial center. After solid contaminant is removed by the filter system, the oil is returned to the engine parts to be lubricated.

8 Claims, 2 Drawing Sheets

INTEGRATED SEPARATOR FOR SOLID AND GAS CONTAMINANTS IN ENGINE OIL

BACKGROUND OF THE INVENTION

In machinery for construction and transportation using lubricants, for example, engines and various hydraulic devices, it is necessary to remove solid contaminants from the lubricant in order to prevent damage to the machine and to prolong the life of the lubricant. For this purpose, it has been common practice to employ a fiber filter or a centrifugal filter.

On the other hand, it is often necessary to remove gaseous contaminants in hydraulic systems to maintain the efficiency and accuracy of such devices. Conventionally, devices employing buoyancy, vacuum and centrifugal force have been employed for removing gaseous contaminants, examples of which are disclosed in U.S. Pat. No. 4,548,622.

No compact and integrated device has heretofore been known, however, which is capable of simultaneously removing both solid and gaseous contaminants from a lubricant. Such a device is particularly desirable though in the engine manufacturing industry.

Moreover, as the rotational speed and output of automobile and motorcycle engines have lately been increased, the importance of removing gaseous as well as solid contaminants has increased. Excess gaseous contaminants in engine oil can cause serious difficulties, such as excess wear of lubricated parts due to oil starvation and a deterioration of the efficiency of the hydraulic valve lifters.

On the other hand, the space available inside the engine compartment is generally not sufficient to accommodate both an oil filter and a gas separator. Hence, an integrated separator is desired, both from a standpoint of space and in terms of weight.

SUMMARY OF THE INVENTION

Accordingly, an object of the present invention is to provide a compact and integrated separator for removing both solid and gaseous contaminants from engine oil.

In accordance with the above and other objects, the invention provides a compact and integrated separator for removing both solid and gaseous contaminants from engine oil in which a vortex flow chamber for gas removal is combined with an oil filter for subsequent solid filtration.

More specifically, the invention provides a separator device for removing both solid and gaseous contaminants from engine oil or the like including a filter system and a wall defining a vortex flow chamber which has a plurality of pores being formed in the wall to permit oil stripped of gaseous contaminants to pass therethrough. An oil introduction pipe introduces oil into the vortex flow chamber in a tangential direction of the chamber. An oil filter system receives the oil passing through the pores in the wall defining the vortex flow chamber, the oil filter system having a plurality of pores for passing oil filtered of solid contaminants. A gas removal pipe extending into the vortex flow chamber and disposed substantially at the axial center of the vortex flow chamber has a plurality of small pores formed therein for allowing gas-rich oil to pass therethrough. An oil outlet passage passes oil filtered by the filter system to the engine parts to be lubricated.

DESCRIPTION OF THE PREFERRED EMBODIMENTS

Referring to the accompanying drawings, preferred embodiments of the present invention will be described in detail.

Figure 1A:
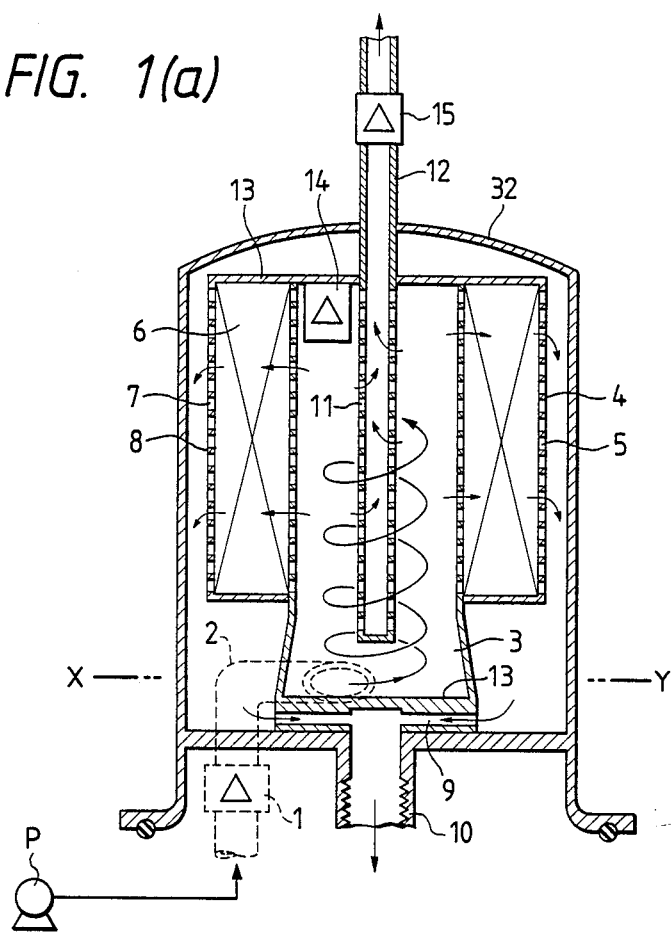
FIG. 1(a) is a cross-sectional view of an integrated separator constructed according to the present invention.

FIG. 1(a) shows a cross-sectional view in a separator for a four-cycle internal combustion engine, which separator is constructed in accordance with the present invention.

An oil pump P pumps out oil containing solid and/or gaseous contaminants to the separator. The oil flow is introduced tangentially into a vortex flow chamber 3 near the bottom 13 of the separator through a relief valve 1 and an inlet pipe 2. The vortex flow chamber 3 has a generally conical shape in its lower portion and a cylindrical shape in its upper portion, the cylindrical upper portion being defined by a cylindrical wall 4. Many small pores 5 are formed in the cylindrical wall 4. A portion of the oil flowing in a vortex pattern inside the cylindrical wall 4 flows out through the pores 5 into a filter system 6. The filtered oil passes outward through small pores 7 formed in the outer wall 8 of the filter system 6, and then passes through a passage 9 into an outflow oil pipe 10. A relief valve 14 is provided between the inlet and outlet sides of the filter system.

Due to the vortical flow of the oil in the vortex flow chamber 3 and the resulting centrifugal force acting on the oil, oil containing gaseous contaminants collects near the axial center of the flow. The gas-rich oil moves radially inwardly through small pores 11 formed in a gas removal pipe 12 provided near the center of the device. The gas removal pipe 12 passes through the upper cover 32 of the separator. A relief valve 15 is disposed in the gas removal pipe 12 outside the separator.

The relief valves 1, 14 and 15 may, for example, be set for relief pressures of 0.2, 1.0 and 2.0 kg/cm$^2$, respectively.

Figure 1B:
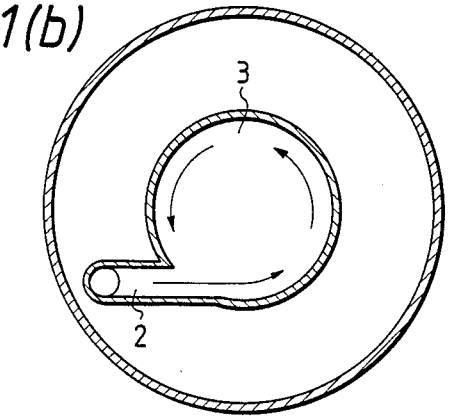
FIG. 1(b) shows a cross section of the separator of FIG. 1(a) taken along a line X-Y in FIG. 1(a)

FIG. 1(b) shows a cross-sectional view of the separator of FIG. 1(a) taken along a line X-Y in FIG. 1(a), specifically showing the region where the inlet pipe 2 extends tangentially into the vortex chamber 3.

Figure 2:
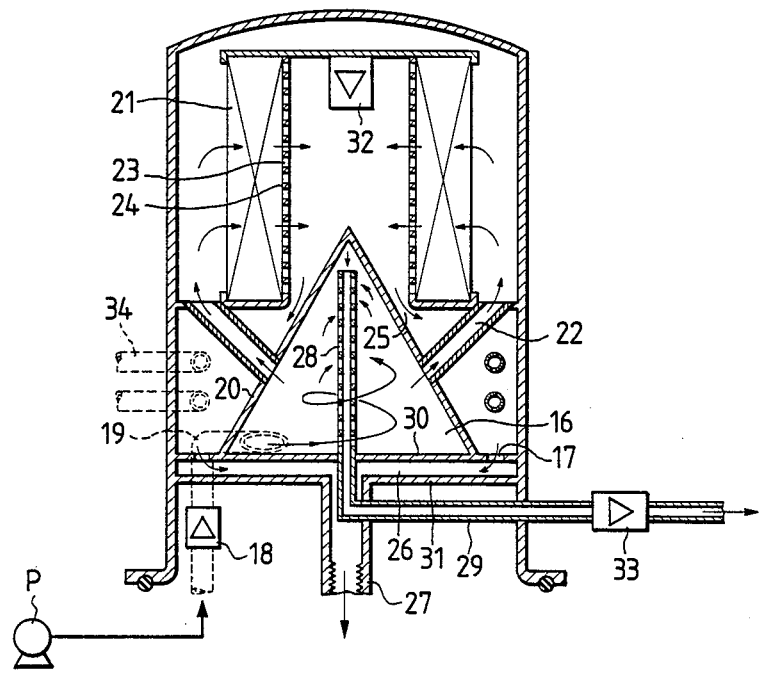
FIG. 2 is a cross-sectional view of another embodiment of an integrated separator of the invention.

FIG. 2 shows a second preferred embodiment of the invention, also intended for use with a four-cycle internal combustion engine.

An oil pump P pumps out oil containing solid and/or gaseous contaminants via a relief valve 18 to the separator. The oil flow is introduced tangentially into a vortex flow chamber 16 near the bottom 30 of the chamber 16 through an inlet pipe 19. The entire vortex flow chamber 16 of this embodiment has a generally conical shape. Due to the vortical flow of the oil within the chamber 16, a portion of the oil at the outer portion of the chamber 16 is forced out through connecting pipes 22, thence flowing into a filter system 21. The filtered oil passes through small pores 23 provided in the inner wall of the filter system. The filtered oil is then sent to the engine via a clearance 25 provided between the outer surface of the conical wall 20 and the filter system 21, the holes 17 provided in the extended bottom of the vortex flow chamber, a passage 26 disposed under the conical chamber 16, and an outlet pipe 27. A relief valve 32 is connected between the inlet and outlet sides of the filter system 21.

The gas-rich oil collected near the axis of the vortex flow compartment 16 is removed through small pores 28 formed in a gas removal pipe 29 provided near the center axis of the vortex flow chamber 16. The gas removal pipe 29 extends through the bottom 30 of the compartment 16 and through the oil outlet pipe 27. A relief valve 33 is disposed in the gas removal pipe 29 outside of the separator.

The relief valves 18, 32 and 33 may be set, for example, to respective relief pressures of 0.2, 1.0 and 2.0 kg/cm$^2$.

Additionally, cooling tubes 34 may be provided which pass through the outer portion of the vortex flow chamber 16.

Figure 3:
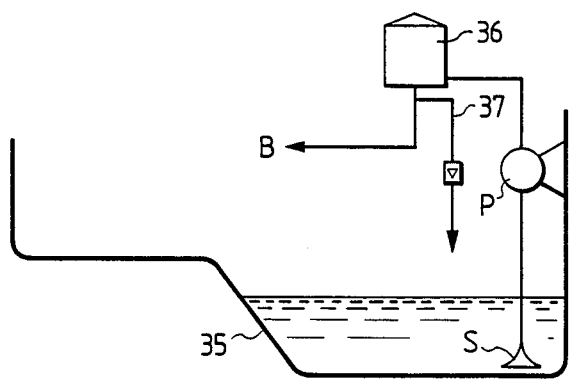
FIG. 3 is a schematic diagram of an engine lubricating system in which the present invention can advantageously be used.

FIG. 3 depicts schematically the connection of a separator device of the invention in a lubricating system of an engine.

Engine oil from an oil pan 35 is pumped by the oil pump P through an oil screen S and supplied to a separator 36. Engine oil stripped of both solid and gaseous contaminants by the separator 36 is supplied to various parts B of the engine to be lubricated, and gas-rich oil is returned to the oil pan 35 through a gas removal pipe 37.

This completes the description of the preferred embodiments of the invention. Although preferred embodiments have been described, it is believed that numerous modifications and alterations thereto may be made without departing from the spirit and scope of the invention.

What is claimed is:

1. A separator device for removing both solid and gaseous contaminants from engine oil or the like, comprising: a wall defining a vortex flow chamber, a plurality of small pores being formed in said wall to permit oil stripped of gaseous contaminants to pass therethrough; an oil introduction pipe for introducing oil into said vortex flow chamber in a tangential direction of said chamber; an oil filter system receiving oil passing through said pores in said wall defining said vortex flow chamber, said oil filter system having a plurality of pores for passing oil filtered of solid contaminants in said oil filter system; a gas removal pipe extending into said vortex flow chamber and disposed substantially at an axial center of said vortex flow chamber, a plurality of small pores being formed in said gas removal pipe for allowing gas-rich oil to pass therethrough; and oil outlet passage means for passing oil filtered by said filter system.

2. The separator device of claim 1, wherein said vortex flow chamber comprises a conical or a cylindrical or a part of conical or a conical portion and a cylindrical portion.

3. The separator device of claim 2, wherein said filter system is disposed around said vortex flow chamber.

4. The separator device of claim 2, further comprising a plurality of connected pipes connected between an outer portion of said vortex flow chamber and said filter system.

5. The separator device of claim 1, further comprising a relief valve provided in said oil introduction pipe.

6. The separator device of claim 1, further comprising a relief valve provided in said gas removal pipe.

7. The separator device of claim 1, further comprising a relief valve provided between the inlet and outlet sides of the filter system.

8. The separator device of claim 1, further comprising at least one cooling pipe passing through an outer portion of said vortex flow chamber.

* * * * *